(12) United States Patent
Solter et al.

(10) Patent No.: US 9,288,281 B2
(45) Date of Patent: Mar. 15, 2016

(54) COMMON INTERFACE COMMUNICATING WITH MULTIPLE BACK-END SERVICES VIA GATEWAY APPLICATION

(71) Applicant: Adobe Systems Incorporated, San Jose, CA (US)

(72) Inventors: Nicholas Aaron Solter, San Jose, CA (US); Brian Delaney, Colorado Springs, CO (US); Jonathan Snyder, Colorado Springs, CO (US); Nick Elser, San Francisco, CA (US); Paul Jones, Provo, UT (US)

(73) Assignee: Adobe Systems Incorporated, San Jose, CA (US)

( * ) Notice: Subject to any disclaimer, the term of this patent is extended or adjusted under 35 U.S.C. 154(b) by 246 days.

(21) Appl. No.: 13/944,777

(22) Filed: Jul. 17, 2013

(65) Prior Publication Data

US 2015/0026236 A1    Jan. 22, 2015

(51) Int. Cl.
  *G06F 15/16* (2006.01)
  *H04L 29/08* (2006.01)
  *H04L 29/06* (2006.01)

(52) U.S. Cl.
  CPC ........ *H04L 67/2838* (2013.01); *H04L 63/0884* (2013.01); *H04L 63/0892* (2013.01)

(58) Field of Classification Search
  CPC ... H04W 84/12; H04L 63/0428; H04L 63/08; H04L 2209/24; H04L 67/16; H04L 9/3226; H04L 9/3228; H04L 9/3234; H04L 9/3236; H04L 9/3239; H04L 9/3242; H04L 9/3247; H04L 9/3257; H04L 63/083; H04L 63/0869; H04L 63/0884; H04L 63/0892
  USPC ............ 709/227, 229, 20, 221; 370/338, 392; 726/1, 6
  See application file for complete search history.

(56) References Cited

U.S. PATENT DOCUMENTS

| | | | | |
|---|---|---|---|---|
| 8,200,818 B2* | 6/2012 | Freund et al. | ................. | 709/225 |
| 8,843,997 B1* | 9/2014 | Hare | ................................ | 726/3 |
| 8,856,344 B2* | 10/2014 | Gould et al. | .................. | 709/226 |
| 2008/0040488 A1* | 2/2008 | Gupta | ..................... | H04L 67/16 |
| | | | | 709/227 |
| 2011/0103393 A1* | 5/2011 | Meier | ..................... | H04L 12/66 |
| | | | | 370/401 |
| 2011/0202755 A1* | 8/2011 | Orsini | ................... | H04L 63/029 |
| | | | | 713/151 |
| 2011/0228763 A1* | 9/2011 | Magnus | ............ | H04M 1/72561 |
| | | | | 370/352 |
| 2013/0238689 A1* | 9/2013 | Matsushima | ........... | H04L 67/42 |
| | | | | 709/203 |

* cited by examiner

*Primary Examiner* — Dhairya A Patel
(74) *Attorney, Agent, or Firm* — Kilpatrick Townsend & Stockton LLP

(57) ABSTRACT

Systems and methods are disclosed for providing a common interface for communicating with multiple back-end services via a gateway application. In an example embodiment, a gateway application receives a first web service request and a second web service request. The first and second web service requests are generated by interactions with a graphical interface provided by the gateway application. The graphical interface can access a first service and a second service using different authentication protocols. The gateway application can respond to the first and second web service requests by executing a first function provided by the first service and a second function provided by the second service. Executing the first and second functions includes transmitting respective first and second service requests to the first and second services that are respective signed using a first authentication protocol for the first service and a second authentication protocol for the second service.

20 Claims, 11 Drawing Sheets

COMMON INTERFACE COMMUNICATING WITH MULTIPLE BACK-END SERVICES VIA GATEWAY APPLICATION

TECHNICAL FIELD

This disclosure relates generally to computer-implemented methods and systems and more particularly relates to providing a common interface for communicating with multiple back-end services via a gateway application.

BACKGROUND

Applications accessible via a data network may utilize multiple back-end services. For example, a social media marketing application may communicate with multiple systems providing different services, such as an analytics service, a campaign development service, a dashboard service, etc. Different services may be implemented using different architectures. For example, a first service may be implemented via Ruby on Rails, a second service may be implemented via PHP, and a third service may be implemented via Java.

Different services implemented using different architectures may not include functions for communicating with one another. For example, a first service using state information (e.g., a cookie) for a session with a user may not be able to share the state information with a second service. A user accessing an application using state information from the first services may experience degraded performance or inconvenience if the application requires state information usable by the second service for proper functionality.

SUMMARY

In an example embodiment, a gateway application receives a first web service request and a second web service request. The first and second web service requests are generated by interactions with a graphical interface provided by the gateway application. The graphical interface can access a first service and a second service using different authentication protocols. The gateway application can respond to the first and second web service requests by executing a first function provided by the first service and a second function provided by the second service. Executing the first and second functions includes transmitting respective first and second service requests to the first and second services that are respective signed using a first authentication protocol for the first service and a second authentication protocol for the second service.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
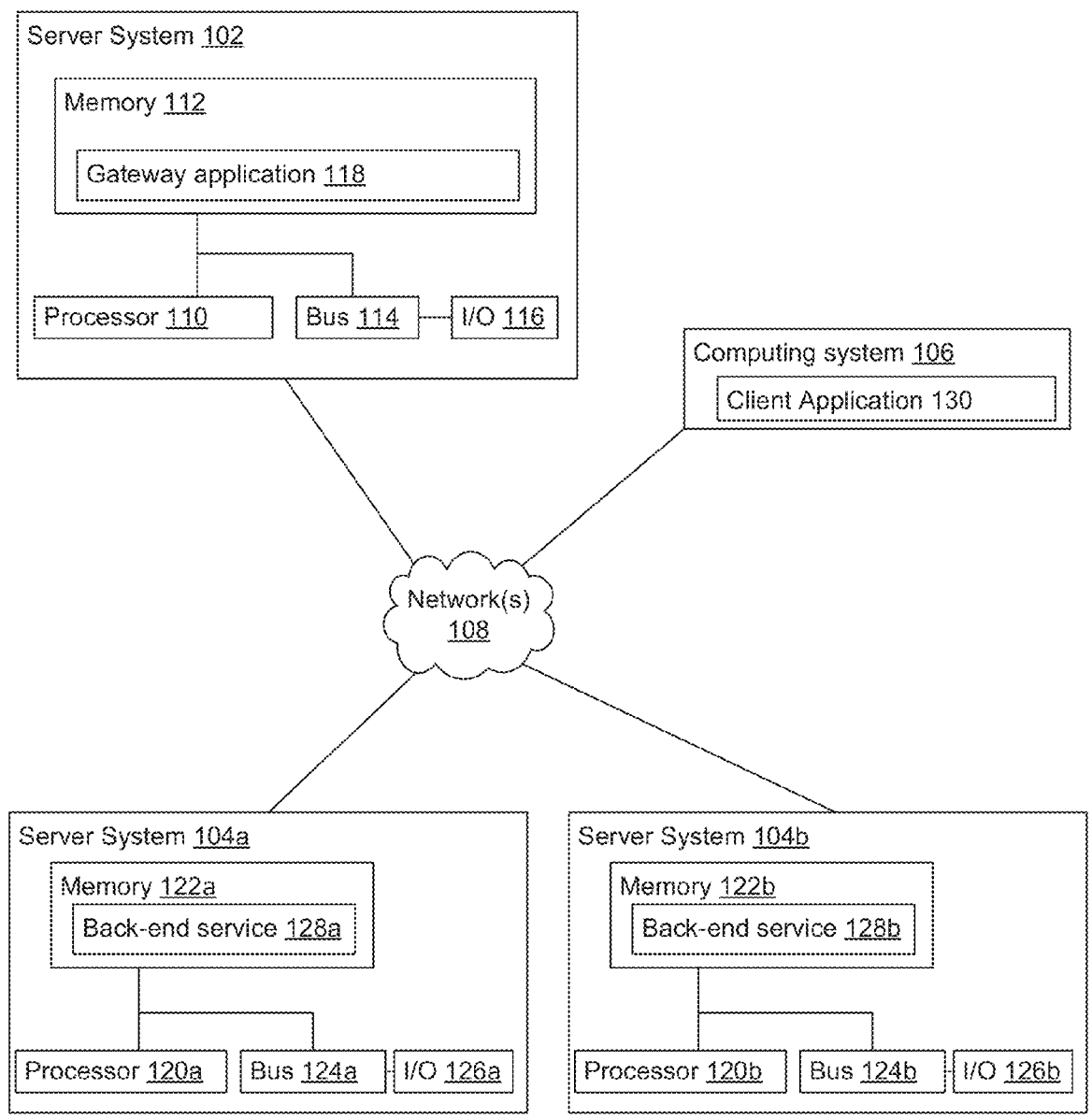
FIG. 1 is a block diagram depicting example computing systems for implementing certain embodiments.

Computer-implemented systems and methods are disclosed for providing a common interface for communicating with multiple back-end services via a gateway application. The gateway application can provide a common HTTP endpoint or other network endpoint for clients to access a variety of services and applications within a common graphical interface. The gateway application can perform authentication, perform session management, and provide a single and/or uniform graphical interface layout. The gateway application can also transform incoming commands received via the graphical interface into service requests for routing to back-end services implemented using different programming languages or other system architectures.

The following non-limiting example is provided to help introduce the general subject matter of certain embodiments. A software application accessible by a client via a data network, such as a web-based application or other suitable application, may provide a graphical interface. Providing the graphical interface can include accessing various back-end services to generate HTML and/or Javascript or other suitable graphical interface components renderable by a browser application. For example, a user may access a social media marketing application via the Internet. A graphical interface for the software application may provide a menu of functions that the user can perform via the software application. The functions can be provided by different back-end services. For example, the same menu may include a first function for creating or managing the content of a marketing campaign and a second function for obtaining analytics regarding different marketing campaigns. A first service, such as a marketing service, may be accessible via the software application for performing functions related to creating or managing the content of a marketing campaign. A second service, such as an analytics service, may be accessible via the software application for performing functions related to obtaining analytics regarding different marketing campaigns. The software application can respond to the selection of one of the first or second functions in the graphical interface by identifying a respective one of the first or second services providing the function, generating a request for the function usable by the service, receiving a response from the service, and output the response in the graphical interface.

In accordance with some embodiments, a gateway application receives a service request via a graphical interface. The gateway application can provide the graphical interface by accessing various back-end services to generate HTML and/or Javascript or other suitable graphical interface components renderable by a browser application. The gateway application can transmit code for the graphical interface to a browser application executed at a computing system. The browser application can render the graphical interface provided by the gateway application based on the HTML and/or Javascript or other suitable graphical interface components. The graphical interface can communicate with first and second services respectively operating on first and second architectures using different authentication protocols. The first architecture can be different from the second architecture. The gateway application can identify the first service or the second service for responding to the service request. The first service or the second service is identified based on parameters extracted from the service request. For example, a request may be a Hypertext Transfer Protocol ("HTTP") request that includes an identifier for one of the services and an identifier for a function provided by the identified service. The gateway application can extract the identifiers for the service and the function from the HTTP request. The gateway application transforms the command into a service request for communication with the first or second service. For example, the gateway application can generate a service request that includes the identifier for the function provided by the service. The service request can be generated in a format that can be interpreted by the identified service, such as a language-independent data-interchange format that can be parsed by different programming languages. A non-limiting example of data formatted in a language-independent data-interchange format is a JavaScript Object Notation ("JSON") message. The gateway application can sign the service request using an authentication protocol specific to the identified service. The gateway application can provide the service request to the identified service and receive data in response to the service request.

In some embodiments, the service request includes shared session information managed by the gateway application. The shared session information managed by the gateway application includes filters such as a selected dataset, a selected date range, an authenticated username and/or company, and/or a selected locale for a user. The gateway application can provide output to the graphical interface based on the response received by the gateway application from the identified service. For example, the gateway application can modify the layout of the graphical interface and/or present data returned by the identified service based on the response from the identified service.

Back-end services may be configured to operate independently of one another to enable independent development of the services. For example, as the functionality of an application or other software tool is expanded, difficulties may arise in coordinating efforts among different developers providing different functions in the application or software tool. Separating an application into loosely coupled services can reduce such difficulties by allowing different functions in different services to be developed independently and integrated via a gateway application.

As used herein, the term "service" is used to refer to one or more systems, one or more applications, and/or a combination thereof for providing electronic content to entities via a data network and/or performing one or more electronic services on behalf of entities via a data network. In some embodiments, a service can require authentication such that the service is accessible by entities identified by or otherwise associated with client accounts or other suitable credentials and/or authentication information. Non-limiting examples of services include analytics applications, social media applications, etc.

As used herein, the term "gateway application" is used to refer to an application that can provide access to data, functions, or other attributes of two or more services.

As used herein, the term "electronic content" is used to refer to any type of media that can be rendered for display or use at a computing system or other electronic device. Electronic content can include text or multimedia files, such as images, video, audio, or any combination thereof. Electronic content can also include application software that is designed to perform one or more specific tasks at a computing system.

As used herein, the term "architecture" is used to refer to a configuration of one or more applications that is used to define logical objects used by applications in a system, properties of logical objects used by applications in the system, communication protocols between logical objects, and the like. An architecture can include a programming language used to implement applications in a system, such as, but not limited to, Ruby on Rails, PHP, etc. An architecture can also include one or more authentication protocols for authenticating entities requesting access to a system. An architecture can also include one or more encryption protocols for securely communicating data with a system and/or between components of a system.

As used herein, the term "authentication protocol" is used to refer to one or more processes used to verify that an entity is authorized to access data, functions, or other attributes of a service or other system. Non-limiting examples of authentication protocls used by back-end services include an OAuth authentication protocol, a Web-Services Security ("WSSE") authentication protocol, etc.

As used herein, the term "signing" is used to refer to encrypting or otherwise modifying a service request or other data message in a manner that demonstrates the authenticity of the service request or other data message to a recipient of the service request or other data message. For example, service requests to be transmitted to a service using an OAuth authentication protocol can be digitally signed in accordance with one or more procedures specified by the OAuth authentication protocol.

As used herein, the term "entity" is used to refer to an individual, organization, or other logical identity that can be uniquely identified by an application or service. An entity can be identified by reference to one or more client accounts and/or by reference to a software identifier and/or hardware identifier associated with an application and/or device used to access a service.

As used herein, the term "cloud service" is used to refer to one or more computing resources, including computing systems and/or applications, that can be provided as an online service via a data network. The collection of computing systems and/or hardware can be represented as a single service. The cloud service can provide a digital hub for browsing, creating, sharing, and otherwise using electronic content using one or more applications provided via the cloud service.

As used herein, the term "back-end service" is used to refer to a service including one or more applications executed on a server system. A back-end service can provide electronic content and/or perform one or more operations in response to a request or command transmitted using a gateway application.

A gateway application can be used to coordinate between services having any difference in implementation architecture. In some embodiments, differences in implementation architecture can include the first service being accessible via a first endpoint of a first communication channel different from a second endpoint of a second communication channel via which the second service is accessible, such as the services being hosted on different computing systems or accessible via different ports. In other embodiments, differences in implementation architecture can include the first service including at least one first function that is incompatible for communication with at least one second function included in the second architecture. For example, one or more function calls of a first programming language may be incompatible with one or more function calls of a second programming language. In other embodiments, differences in implementation architectures can include differences in authentication procedures for the different services.

As used herein, the term "communication channel" is used to refer to a bi-directional network connection established between a first computing system, such as a first server providing a gateway application, and a second computing system, such as a second server providing a back-end service. A non-limiting example of a communication channel is a network connection between different devices on a common network domain.

As used herein, the term "network domain" is used to refer to logical groups of computing devices connected to a computer network used to identify the computing devices in various forms of electronic communication such as the Internet, e-mail, etc.

As used herein, the term "port" is used to refer to a logical construct used as an endpoint for a communication channel by an operating system of a computing system. Applications hosted on a computing system can access data addressed to the port. For example, the operating system of a computing system can address packetized data to a specific port on a server by including a port number identifying the destination port in the header of each data packet transmitted to the server. When the server receives the addressed data packets, the operating system of the server can route the data packets to the port that is the endpoint for a socket connection or other communication channel.

As used herein, the term "function call" is used to refer to an expression in a programming language identifying an action to be performed. A function call can include a name of the function and a list of inputs or other parameters on which the function will act.

Referring now to the drawings, FIG. 1 is a block diagram depicting example computing systems for implementing certain embodiments. The example computing systems include a server system 102, server systems 104a, 104b, and a computing system 106 in communication via one or more data networks 108.

The server system 102 and the server systems 104a, 104b respectively include processors 110, 120a, 120b. Non-limiting examples of processors 110, 120a, 120b include a microprocessor, an application-specific integrated circuit ("ASIC"), a state machine, or other suitable processing device. Each of the processors 110, 120a, 120b can include any number of computer processing devices, including one. Each of the processors 110, 120a, 120b can be communicatively coupled to a computer-readable medium, such as memories 112, 122a, 122b, respectively. The processors 110, 120a, 120b can execute computer-executable program instructions and/or access information stored in the memories 112, 122a, 122b.

The memories 112, 122a, 122b can store instructions that, when executed by the processors 110, 120a, 120b, cause the processor to perform operations described herein. The memories 112, 122a, 122b may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), floppy disk(s), CD-ROM, DVD, or any other medium from which a computer processor can read instructions. The instructions may comprise processor-specific instructions generated by a compiler and/or an interpreter from code written in any suitable computer-programming language. Non-limiting examples of suitable computer-programming languages include Ruby on Rails, C, C++, C#, Visual Basic, Java, Python, Perl, JavaScript, ActionScript, and the like.

The server systems 102, 104a, 104b can also respectively include buses 114, 124a, 124b. The buses 114, 124a, 124b can communicatively couple one or more components of each of the server systems 102, 104a, 104b, respectively.

Each of the server systems 102, 104a, 104b can respectively include a number of external or internal devices, such as input or output devices. For example, the server systems 102, 104a, 104b are respectively depicted with input/output ("I/O") interfaces 116, 126a, 126b for receiving input data from input devices and/or providing output data to output devices.

FIG. 1 also depicts a gateway application 118 comprised in the memory 112 of the server system 102. The gateway application 118 can configure the processor 110 to generate a graphical interface configured to receive input selecting functions performed by one or more back-end services 128a, 128b respectively embodied in the memories 122a, 122b. The operations of the gateway application 118 are described in greater detail with respect to FIGS. 2-8 below.

A client application 130 can be executed or otherwise used at the computing system 106. The client application 130 can include one or more software modules for establishing communication with the service provider application 120. A non-limiting example of a client application 130 is a web browser application.

The server system 102 can include any suitable computing system for hosting the service provider application 120. In one embodiment, the server system 102 may be a single computing system, such as a server system. In another embodiment, the server system 102 may be a virtual server implemented using a number of computing systems connected in a grid or cloud computing topology.

The computing system 106 can include any suitable computing device or system for communicating via a data network 108 and executing the client application 130. Non-limiting examples of suitable computing devices or systems include a desktop computer, a tablet computer, a smart phone, or any other computing device or system suitable for using electronic content.

Figure 2:
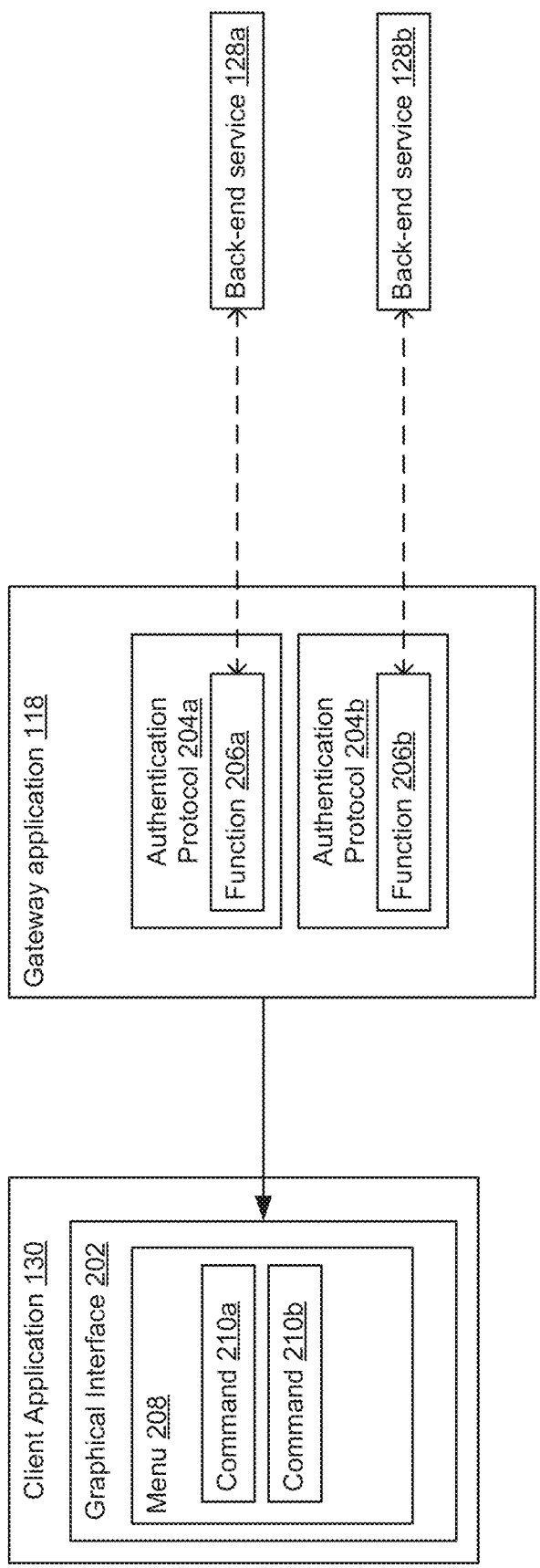
FIG. 2 is a modeling diagram depicting an example flow of communications for a client application requesting a function provided by one or more back-end services via a graphical interface provided by a gateway application.

FIG. 2 is a modeling diagram depicting an example flow of communications for a client application 130 requesting a function provided by one or more back-end services 128a, 128b via a graphical interface 202 provided by a gateway application 118.

In some embodiments, the gateway application 118 can be accessed by a client application 130 that is a web browsing application. The gateway application 118 can provide a single HTTP endpoint or other logical endpoint for client applications 130 to access different back-end services 128a, 128b. The gateway application 118 can generate a common graphical interface 202 that can be displayed via a web browser application or other suitable client application 130. For example, the gateway application 118 can provide a graphical interface 202 for accessing one or more applications and/or services provided by a cloud service executed on the server system 102 or another computing system in communication with the server system 102.

The gateway application 118 can provide the graphical interface 202 by accessing the back-end services 128a, 128b to generate HTML and/or Javascript or other suitable graphical interface components renderable by a browser application or other suitable client application 130 executed at the computing system 106. The gateway application 118 can transmit code for the graphical interface 202 to the browser application or other suitable client application 130. The browser application or other suitable client application 130 can render the graphical interface 202 provided by the gateway application 118 based on the HTML and/or Javascript or other suitable graphical interface components.

The back-end services 128a, 128b can perform different types of operations in response to input received via the gateway application 118. For example, a social media publishing back-end service may process requests to publish to a social media service accessible via the client application 130 and a reporting service may generate output data to be provided as a report to the client application 130.

The back-end services 128a, 128b can be implemented using (or otherwise operate on) different architectures. One non-limiting example of a difference between architectures used to implement the back-end services 128a, 128b is the use of different authentication protocols 206a, 206b for verifying that an entity is authorized for accessing the back-end services 128a, 128b. For example, a first back-end service 128a may use an authentication protocol 204a such as an OAuth authentication protocol and a second back-end service 128b may use an authentication protocol 204b such as a WSSE authentication protocol. The different authentication protocols 204a, 204b can utilize different processes for authenticating an entity. The gateway application 118 can provide a logical abstraction layer such that the appropriate authentication protocols 204a, 204b can respectively be used for each of the back-end services 128a, 128b. The gateway application 118 can sign and/or otherwise format service requests in a manner specific to a given one of the authentication protocols 204a, 204b.

Another non-limiting example of a difference between architectures used to implement the back-end services 128a, 128b is the use of different programming languages to implement the back-end services 128a, 128b. For example, each of the back-end services 128a, 128b may be implemented using any of Ruby-on-Rails, PHP, Java, etc. A programming language used to implement back-end service 128a may be incompatible for communication with programming language used to implement back-end service 128b. Another non-limiting example of a difference between architectures used to implement the back-end services 128a, 128b is the use of different application programming interfaces ("API") to implement the back-end services 128a, 128b. An API for a back-end service 128a may include functions for which the API of a back-end service 128b lacks a corresponding function call.

Another non-limiting example of a difference between architectures used to implement the back-end services 128a, 128b is the use of different endpoints and/or different communication channels to access the back-end services 128a, 128b. The use of different endpoints and/or different communication channels can include (but is not limited to) the back-end services 128a, 128b being hosted on different network domains, being hosted on computing systems with different network addresses, being accessible via different ports, etc.

The graphical interface 202 can be generated based at least partially on one or more functions provided by the back-end services 128a, 128b. As depicted in FIG. 2, functions 206a, 206b accessible via the gateway application 118 may be respectively provided by the back-end services 128a, 128b. Although each of the back-end services 128a, 128b is respectively depicted in FIG. 2 as providing a single function for purposes of simplicity, each of the back-end services 128a, 128b can provide any number of functions accessible via a graphical interface 202 and/or a gateway application 118.

The gateway application 118 can combine visual representations of the functions 206a, 206b, in the graphical interface 202. For example, a gateway application 118 may provide access to the functions 206a, 206b via a menu 208. The gateway application can include the menu 208 in the graphical interface 202. The menu 208 can include functions from the back-end services 128a, 128b. For example, a menu 208 can include commands 210a, 210b corresponding to functions 206a, 206b, such as a marketing campaign function 206a and analytics function 206b. The client application 130 can generate Ajax commands or other suitable commands in response to selections of commands 210a, 210b in the graphical interface 202.

In some embodiments, the graphical interface 202 can be generated based on the permissions associated with a given entity with respect to the back-end services 128a, 128b. For example, a client entity accessing the gateway application 118 via the client application 130 may have sufficient permission to access the function 206a provided by the back-end service 128a and lack sufficient permission to access the function 206b provided by the back-end service 128b. The gateway application 118 can present a command 210 in the menu 208 and hide or otherwise exclude a command 210b from the menu 208.

In some embodiments, the gateway application 118 can authenticate client entities accessing the gateway application 118 via the client application 130. For example, the gateway application 118 can generate a prompt in the graphical interface 202 for receiving authentication information about an entity. Non-limiting examples of authentication information include a user name, a password, biometric data, a personal identification number, a digital certificate, or some combination thereof. The authentication information can be used to verify that an entity is authorized to access functions provided by the back-end services 128a, 128b, as described in greater detail below.

A session can include a period of time during which the client application 130 can access services or applications via the gateway application 118. A session can be delineated by a first point in time at which an entity is authenticated using the gateway application 118 and a second point in time at which the authentication is terminated (e.g., via the entity logging out of the gateway application 118 or the authentication expiring after a period of inactivity).

The gateway application 118 can also perform session management for communication sessions between the gateway application 118 and the client application 130. Session management can include tracking of activity by an entity during a session and/or across multiple sessions. Non-limiting examples of session management can include tracking which back-end services 128a, 128b are accessed by the client application 130, which electronic content has been accessed by the client application 130, etc. A state during a first session can be recreated in a second session, such as by providing access to the same back-end services 128a, 128b and/or electronic content in the second session that was accessed during the first session.

In some embodiments, the gateway application 118 may also include features specific to web browser interfaces. For example, the gateway application 118 may include common Javascript components or other suitable graphical interface libraries for integrating functions 206a, 206b from different back-end services 128a, 128b. The Javascript components or other suitable graphical interface libraries can allow the gateway application 118 to interact with back-end services 128a, 128b implemented using different back-end architectures.

Figure 3:
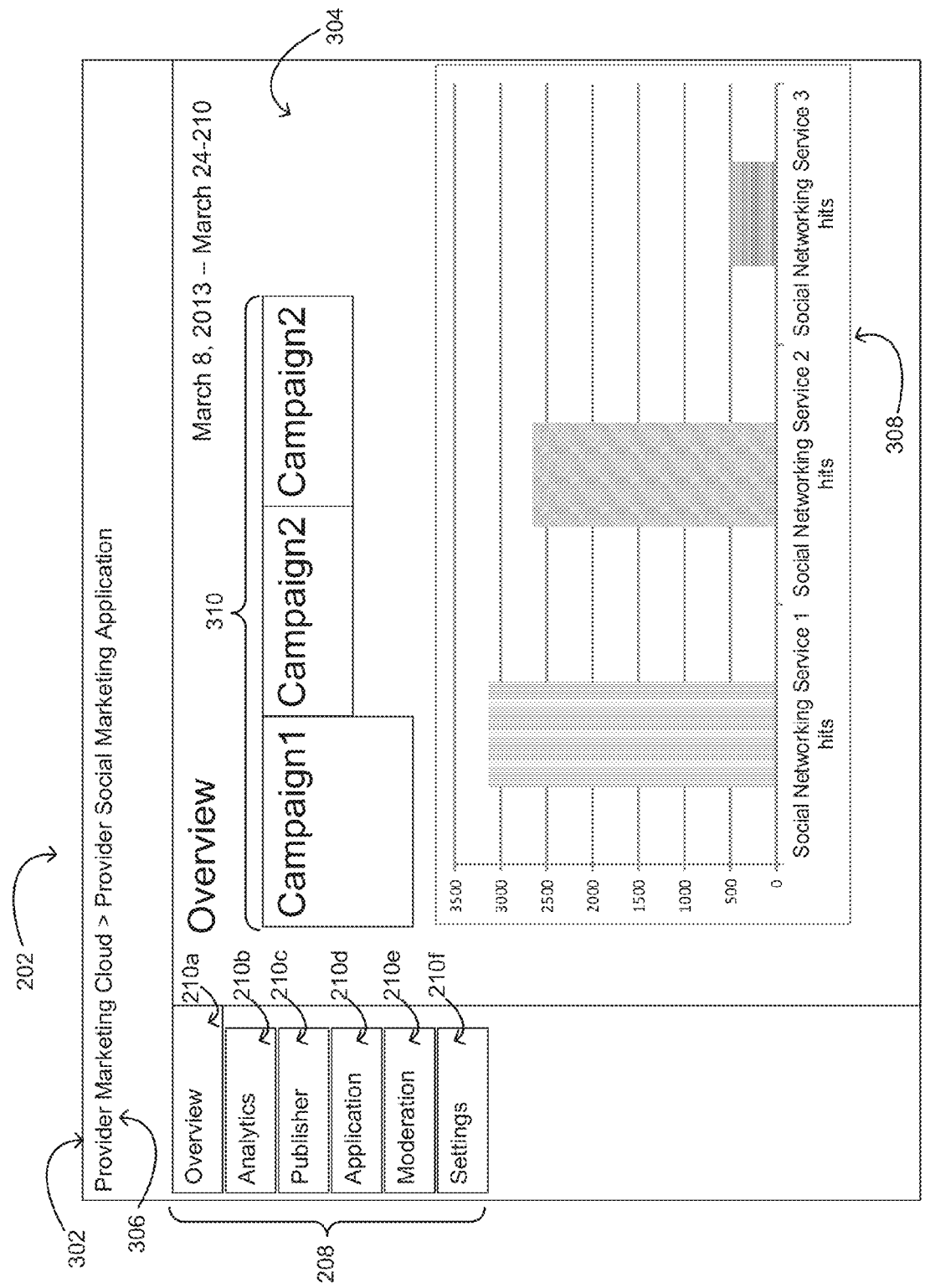
FIG. 3 is a modeling diagram depicting an example graphical interface provided by the gateway application.

FIG. 3 is a modeling diagram depicting an example graphical interface 202 provided by the gateway application 118. The graphical interface 202 can include a common interface 302 and a service interface 304.

The common interface 302 can include one or more objects, commands, or other features accessible via the gateway application 118. For example, the common interface 302 can include a title area 306 that identifies a tool such as a "Provider Social Marketing Application" provided via a cloud service titled "Provider Marketing Cloud." A tool can be a logical representation of a product or core solution for accessing a collection of back-end services. The common interface 302 can also include a menu 208 that includes links to different functions provided by the back-end services 128a, 128b. For example, as depicted in FIG. 3, an "Overview" function accessible via a command 210a of the menu 208 can be provided by a dashboard back-end service. An "Analytics" function accessible via a command 210b of the menu 208 can be provided by an analytics or reporting back-end service. A "Publisher" function accessible via a command 210c of the menu 208 can be provided by a back-end service used to publish postings or other electronic content to one or more social network services. An "Application" function accessible via a command 210d of the menu 208 can be provided by a back-end service used to create one or more social networking applications. A "Moderation" function accessible via a command 210e of the menu 208 can be provided by a back-end service used to moderate comments in response to postings published via the "Publisher" function. A "Settings" function accessible via a command 210f of the menu 208 can be provided by the gateway application 118 to control one or more configuration settings for the display of the graphical interface 202.

The service interface 304 can include features and/or data provided by a selected one of the back-end services 128a, 128b. For example, as depicted in FIG. 3, the service interface 304 can include data 308 provided by the back-end service 128a. The data 308 can include, for example, as a bar graph showing different levels of interaction in different social media services for published social networking content related to a marketing campaign. A menu 310 provided in the service interface 304 can be used to selectively display subsets of the data 308 displayed based on one or more criteria.

For example, as depicted in FIG. 3, a marketing campaign (e.g., "Campaign1," "Campaign2," or "Campaign3") can be selected from a menu 310 provided in the service interface 304. The data 308 can include a bar graph showing different levels of interaction in different social media services for published social networking content related to a marketing campaign "Campaign1".

Figure 4:
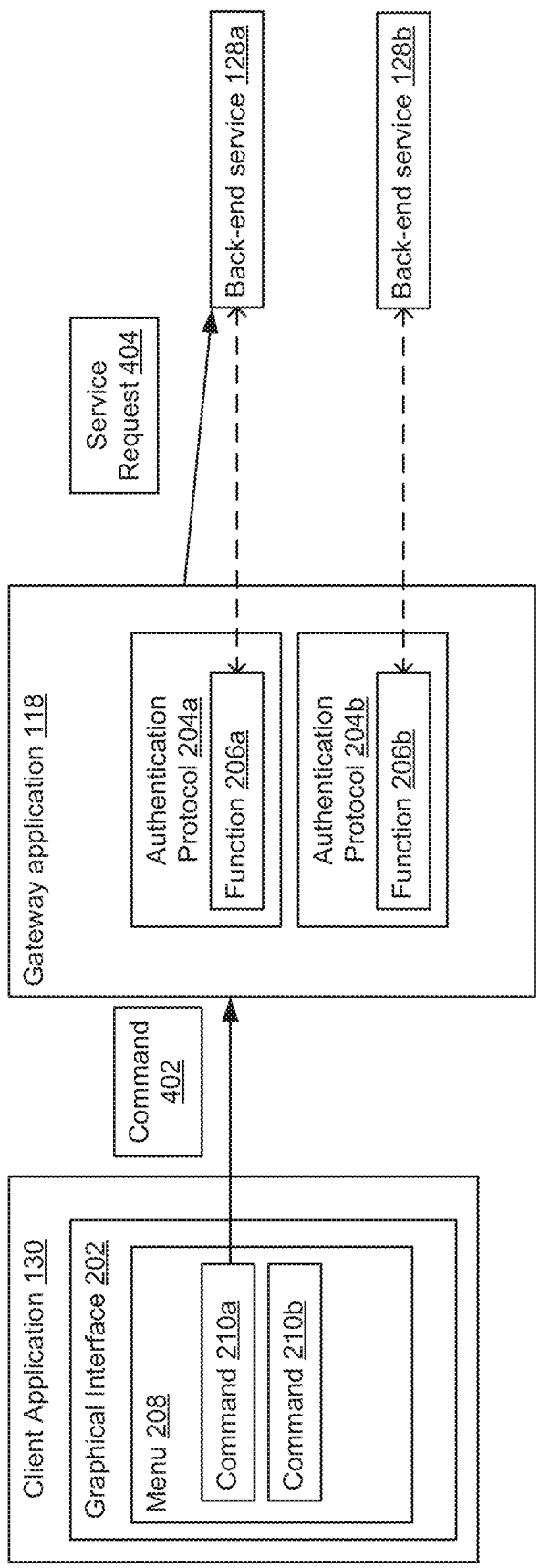
FIG. 4 is a modeling diagram depicting an example flow of communications for the gateway application providing a service request to a back-end service.

FIG. 4 is a modeling diagram depicting an example flow of communications for the gateway application 118 providing a service request 404 to the back-end service 128a.

As depicted in FIG. 4, the client application 130 can generate a command 402 for one or more of the back-end services 128a, 128b via interaction with a command in the graphical interface 202. The command 402 can identify one of the back-end services 128a, 128b, a function provided by one of the back-end services 128a, 128b, and one or more parameters for the back-end service.

A non-limiting example of a command 402 is an HTTP request or other web request that includes a uniform resource locator ("URL"). The HTTP request can be generated by, for example, the selection of one of the commands 210a-f in a menu 208. The URL can include parameters usable by the gateway application 118 to access, integrate, or otherwise use the operations of the one or more of the back-end services 128a, 128b.

In a non-limiting example, a user can select the commands 210a from the graphical interface 202. Selecting the command 210a can generate a command 402 for a tool titled "Social Marketing Application" and a back-end service 128a titled "Service1" having a function 206a titled "Overview". The request 404 can include a URL such as "/SocialMarketingApplication/Service1/overview". A first parameter in the URL may identify the tool (e.g., "/SocialMarketingApplication"). The tool can be used for determining the menu displayed to a user, for controlling access to functions specific to the tool and provided by the back-end services, and/or for determining the default page to be displayed in response to the user switching to the tool. A second parameter in the URL may identify which of the back-end services 128a, 128b are to be accessed via the gateway application 118 (e.g., "/Service1"). For example, the command 402 may identify the back-end service 128a. A third parameter in the URL may identify the function 206a provided by the back-end service 128a (e.g., "/overview"). In some embodiments, additional parameters in the URL may identify one or more inputs to be provided to the function 206a.

The gateway application 118 can transform the command 402 for transmission to one or more of the back-end services 128a, 128b identified by the command 402. The service request 404 can include one or more parameters extracted from the command 402. A non-limiting example of information extracted from the command 402 is a data from one or more forms included in the graphical interface. For example, data from one or more forms can be provided as data inputs to a function 206a provided by the back-end service 128a.

The service request 404 can also include state information provided by the gateway application 118. State information can include information about a session established between the gateway application 118 and the client application 130. State information can be stored to the memory 112. One non-limiting example of state information is authentication information obtained by the gateway application 118 from a client entity via the client application 130. In some embodiments, the authentication information can be digitally signed by the gateway application 118 via a suitable authorization protocol. A non-limiting example of a suitable authorization protocol is OAuth. One non-limiting example of OAuth signing may involve using a form of Oauth such as two-legged Oauth. A two-legged Oauth process may involve using a Hash Message Authentication Code ("HMAC"). The HMAC can notify the target back-end service that a request was generated by the gateway application 118 and that the request includes valid credentials for a user and account. Another non-limiting example of an authentication standard that the gateway application 118 may use is a Restful form of WSSE. A Restful form of WSSE may provide a signature in a different format and sign a request using a mechanism that is similar to HMAC to guarantee authenticity of the request. In additional or alternative embodiments, the authentication information can be digitally encrypted by the gateway application 118 via a suitable encryption process. A non-limiting example of a suitable encryption process is a keyed-hash message authentication code ("HMAC") process.

Another non-limiting example of state information is a requested language in which data from the back-end service 128a is to be provided. For example, the back-end service 128a may be configured to generate reporting data in different human-readable languages (e.g., English, Chinese, Tagalog, etc.). The human-readable language can be configured via the graphical interface 202. Another non-limiting example of state information can include an output format for the data. For example, a service request 404 to a reporting back-end service 128a may identify a specific reporting format in which the data is to be arranged.

Providing state information in a service request 404 from the gateway application 118 to the back-end service 128a can allow the back-end service 128a to operate in a stateless manner. The back-end service 128a operating in a stateless manner can involve the back-end service 128a providing a response to a service request 404 that is based on the information included in the service request 404 and that is not based on any information included in previous requests.

The service request 404 can also include shared session information managed by the gateway application 118. The shared session information managed by the gateway application includes filters such as a selected dataset, a selected date range, an authenticated username and/or company, and/or a selected locale for a user.

The service request 404 can be formatted such that the back-end service 128a can return data in response to the request. For example, the service request 404 can be include one or more HTTP headers and/or extension headers that can be provided to the back-end service 128a. In some embodiments, the gateway application 118 can provide a set of pre-defined headers describing a state to a given one of the back-end services 128a, 128b. The pre-defined headers can be consistent between different back-end services 128a, 128b.

In some embodiments, the service request 404 can be formatted as a JSON message or other language-independent format. A JSON message can include simple data structures in a language-independent format. Each of the back-end services 128a, 128b can include a parsing component specific to a respective programming language used to implement the back-end service. The parsing component can identify the data structures and content of a message formatted as a JSON message or other language-independent format.

Figure 5:
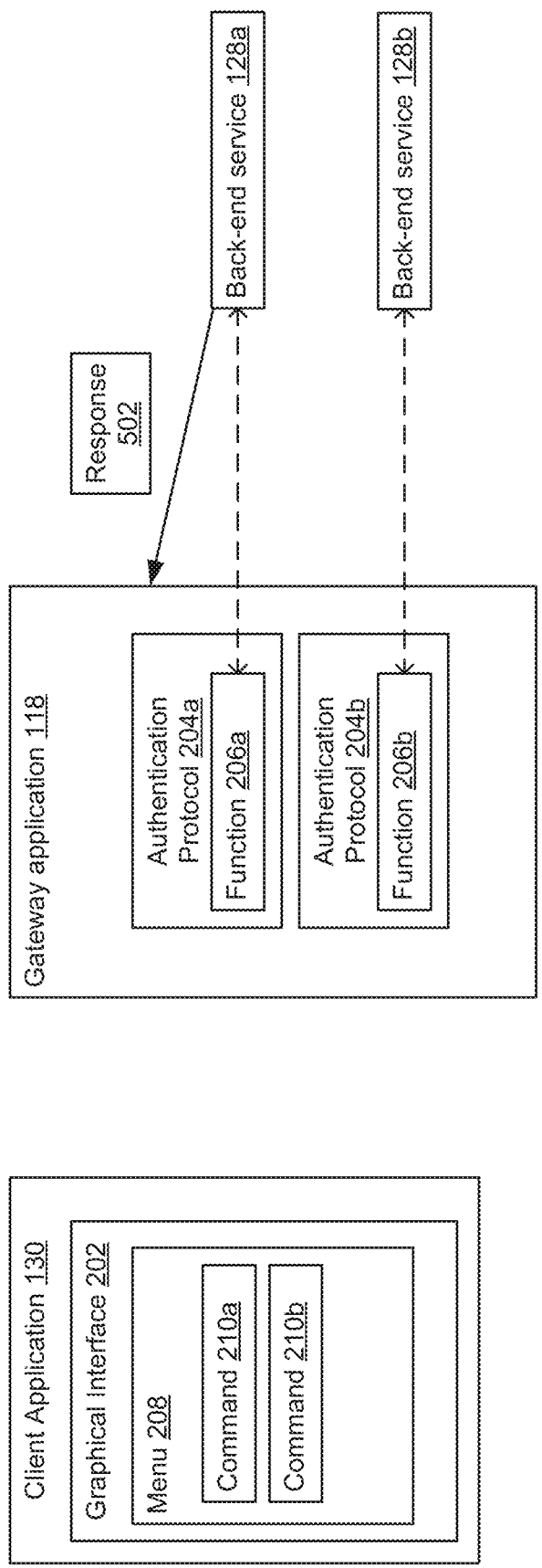
FIG. 5 is a modeling diagram depicting an example flow of communications for the gateway application receiving a response to the service request from the back-end service.

FIG. 5 is a modeling diagram depicting an example flow of communications for the gateway application 118 receiving a response 502 to the service request 404 from the back-end service 128a. In some embodiments, the response 502 can include a presentation message. A non-limiting example of a presentation message is a JSON message or other message in a language-independent format that includes HTML-formatted attributes to be rendered in the graphical interface 202, such as (but not limited to), a web page title, a web page layout, filters to be included on the a web page, etc. In other embodiments, the response 502 can include a data message. A data message can include a command to present data provided by one or more of the back-end services 128a in response to a service request. A non-limiting example of a data message is a Javascript command or command for another suitable graphical interface library executable by the gateway application 118.

Figure 6:
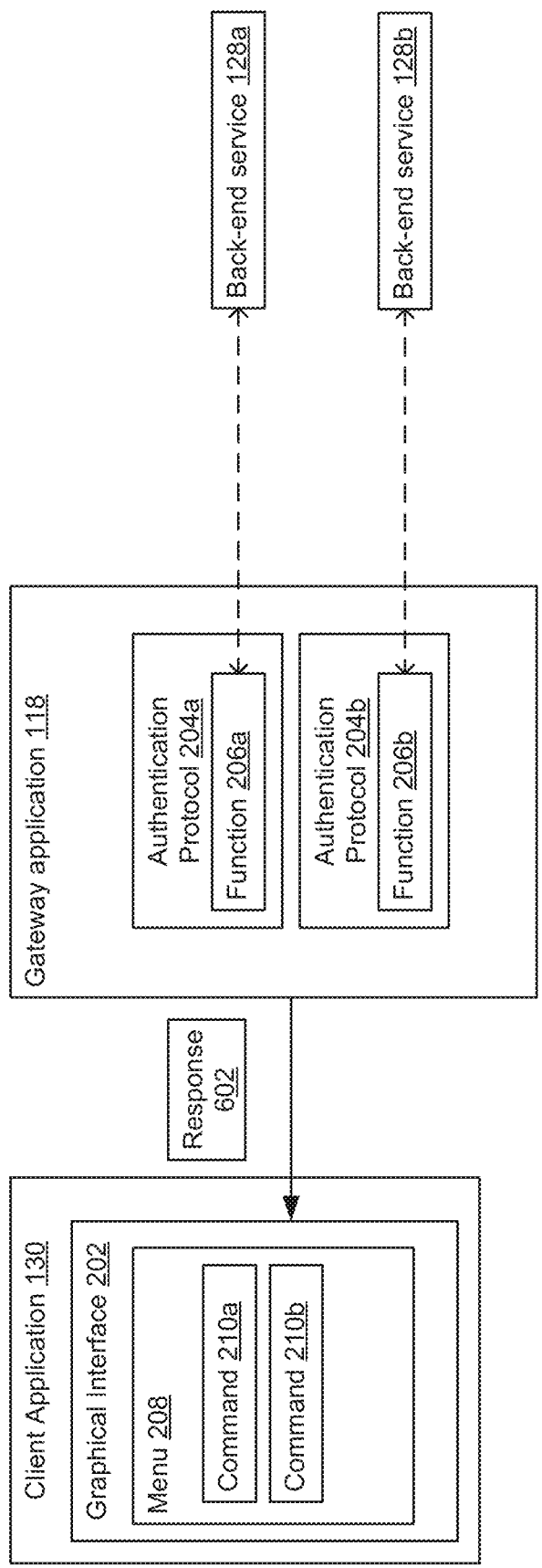
FIG. 6 is a modeling diagram depicting an example flow of communications for the gateway application providing a response to a client application via the graphical interface.

FIG. 6 is a modeling diagram depicting an example flow of communications for the gateway application 118 providing a response 602 to a client application 130 via the graphical interface 202. The response 602 can include one or more modifications to the graphical interface 202, such as a command to render a new window within the graphical interface that includes data returned from the back-end service 128a. The response 602 can also include data returned from the back-end service 128a in response to the service request 404.

Although FIGS. 1-5 depict a single graphical interface generated for a single tool, other implementations are possible. In some embodiments, a gateway application 118 can provide access to multiple tools and multiple back-end services 128a, 128b. The gateway application 118 can generate custom graphical interfaces for accessing different back-end services via different tools.

Figure 7:
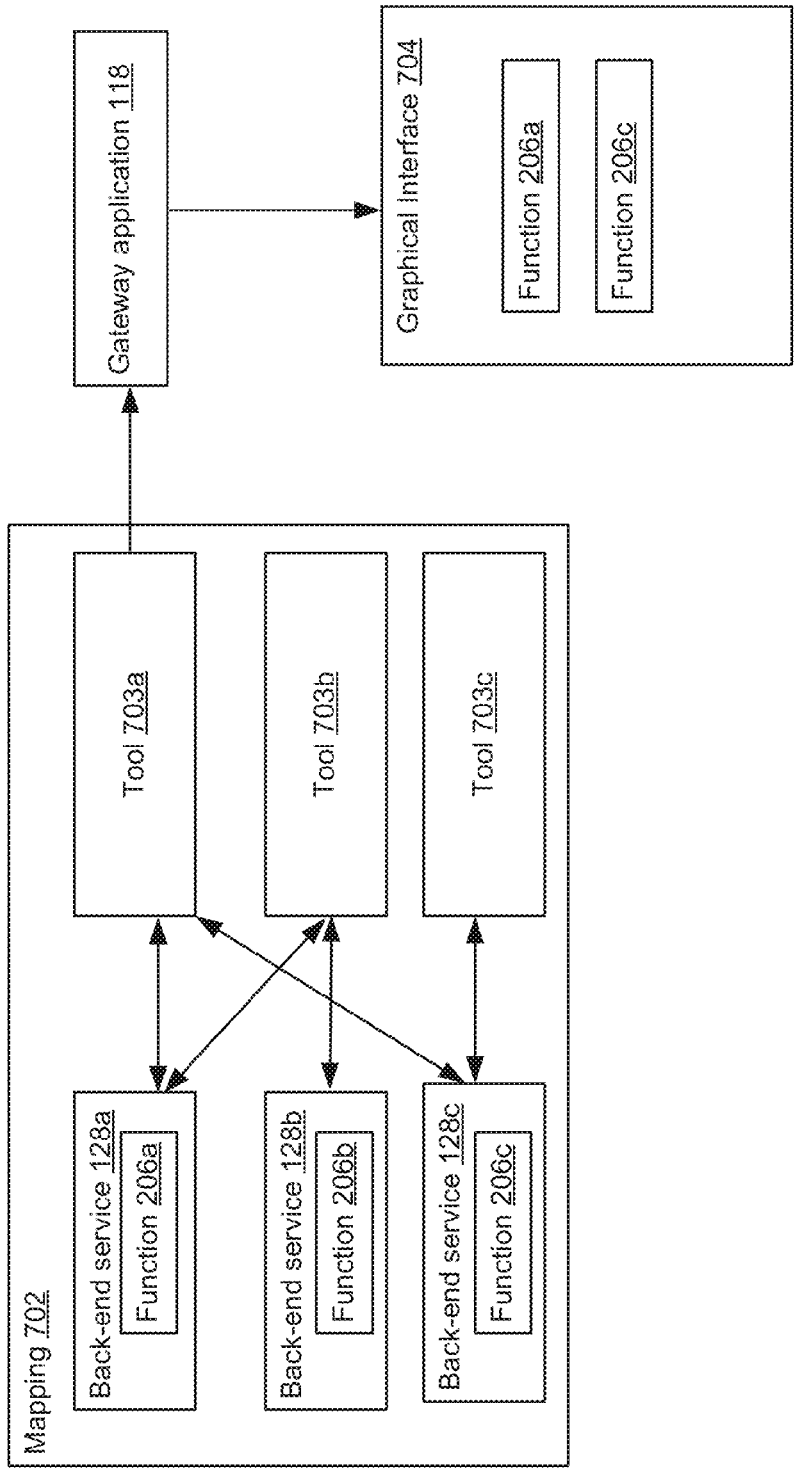
FIG. 7 is a modeling diagram depicting an example flow of communications for the gateway application generating a first graphical interface for a first tool associated with a a first set of back-end services.
Figure 8:
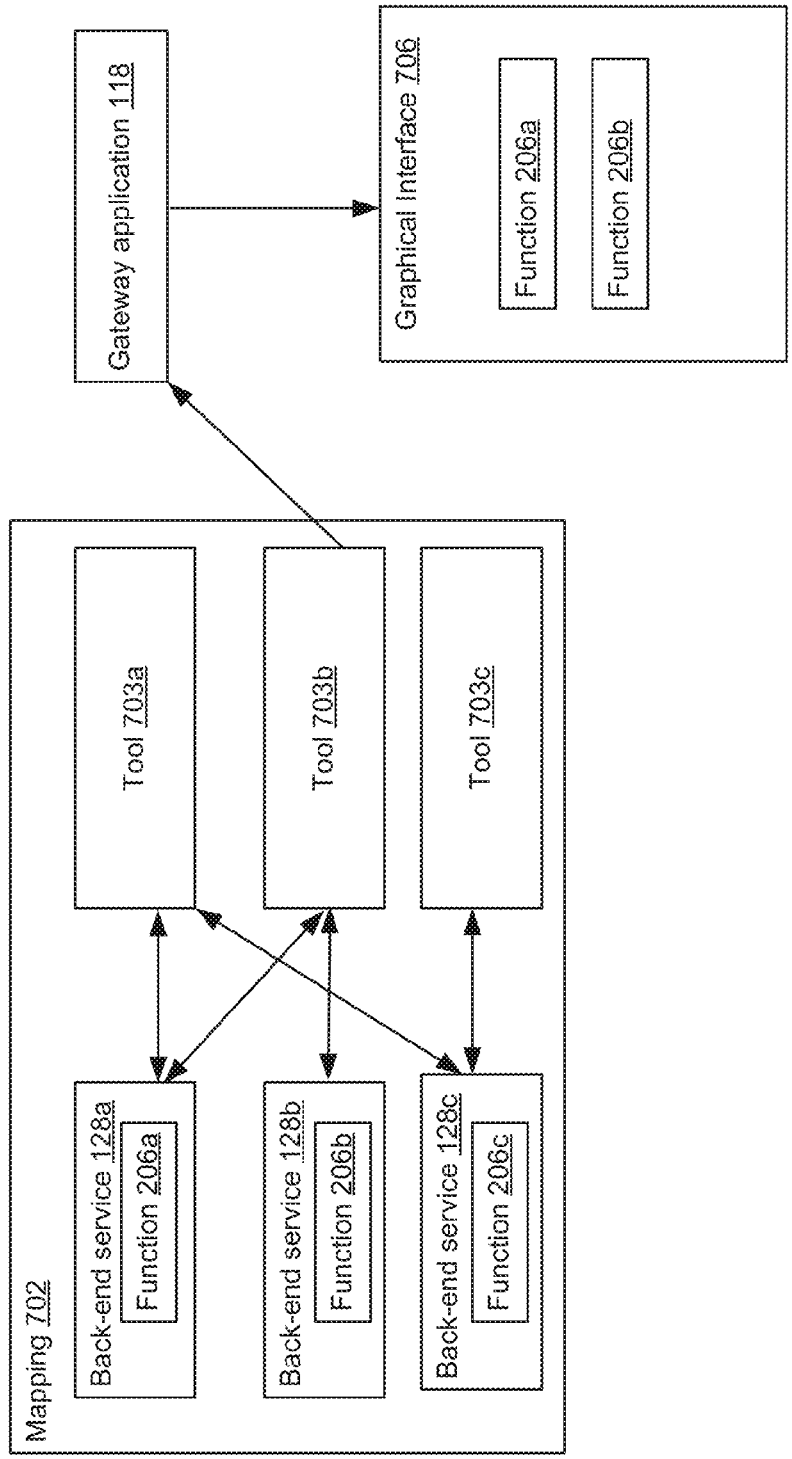
FIG. 8 is a modeling diagram depicting an example flow of communications for the gateway application generating a second graphical interface for a second tool associated with a second set of back-end services.

FIGS. 7-8 are modeling diagrams depicting example flows of communications for the gateway application 118 generating different graphical interfaces for different tools associated with different sets of back-end services.

As depicted in FIGS. 7-8, the gateway application 118 can access a mapping 702 between back-end services 128a-c and tools 703a-c provided by the gateway application 118. The tools 703a-c are logical representation of a product or core solution for accessing a collection of back-end services. For example, a tool 703a can be used to access back-end services 128a, 128c, a tool 703b can be used to access back-end services 128a, 128b, and a tool 703c can be used to access the back-end service 128c.

The gateway application 118 can generate a graphical interface 704 the tools 703a-c and one or more of the functions 206a-c respectively provided by the back-end services 128a-c. For example, the gateway application 118 can generate a graphical interface 704 for the tool 703a that can be used to access functions 206a, 206c (as depicted in FIG. 7) and/or a graphical interface 706 for the tool 703b that can be used to access functions 206a, 206b (as depicted in FIG. 8).

Figure 9:
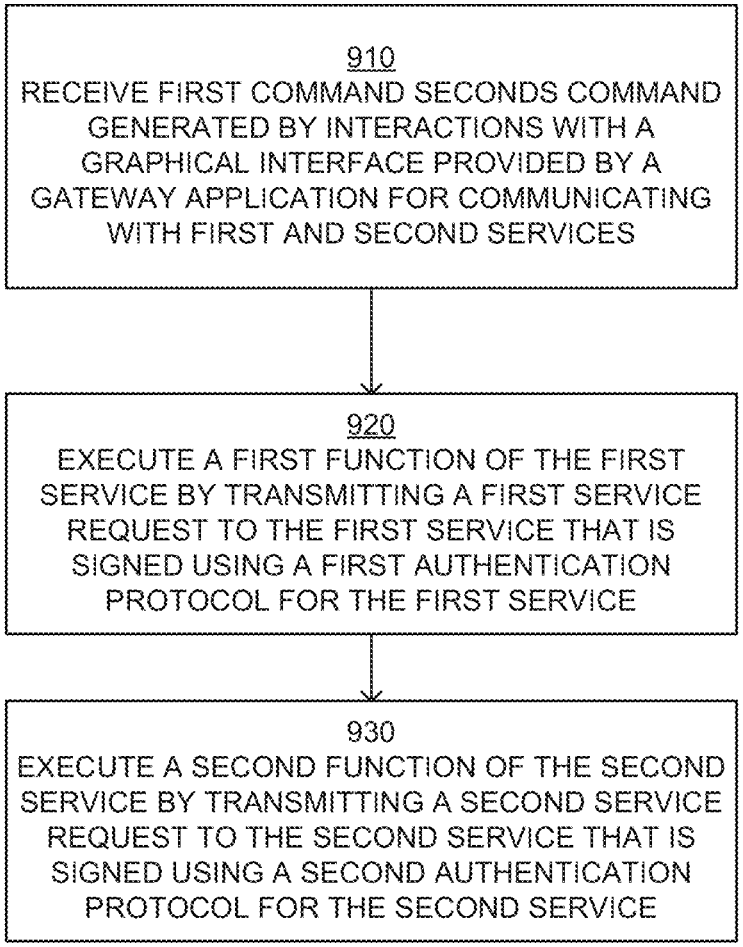
FIG. 9 is a flow chart illustrating an example method for communicating with multiple back-end services via common interface provided by a gateway application.

FIG. 9 is a flow chart illustrating an example method for communicating with multiple back-end services via common interface provided by a gateway application. For illustrative purposes, the method 900 is described with reference to the system implementations depicted in FIG. 1 and the flow of communication depicted in FIGS. 2-6. Other implementations, however, are possible.

The method 900 involves receiving a first command and a second command generated by interactions with a graphical interface 202 provided by the gateway application 118 for communicating with the services 128a, 128b, as shown in block 910. For example, the processor 110 of the server system 102 can execute the gateway application 118 to receive commands 402 from a client application 130, as described above with respect to FIGS. 1-5.

The method 900 further involves responding to the first command by executing a first function of the first service by transmitting a first service request to the first service that is signed using a first authentication protocol for the first service, as shown in block 920. For example, the processor 110 of the server system 102 can execute the gateway application 118 to execute a function 206a by transmitting a service request 404 to the back-end service 128a, as described above with respect to FIGS. 1-5.

The method 900 further involves responding to the second command by executing a second function of the second service by transmitting a second service request to the second service that is signed using a second authentication protocol for the second service, as shown in block 930. For example, the processor 110 of the server system 102 can execute the gateway application 118 to execute a function 206b by transmitting a second service request 404 to the back-end service 128b, as described above with respect to FIGS. 1-5.

Figure 10:
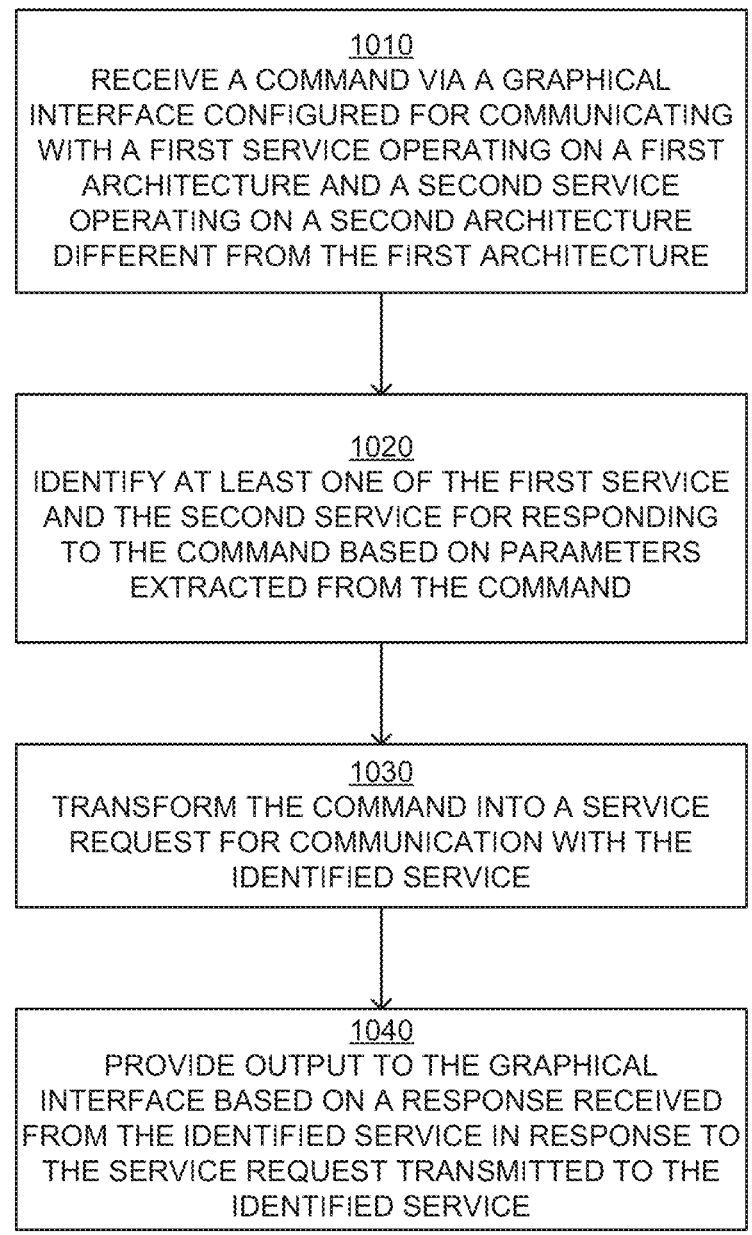
FIG. 10 is a flow chart illustrating an example method for providing a common interface for communicating with multiple back-end services via a gateway application.

FIG. 10 is a flow chart illustrating an example method 1000 for providing a common interface for communicating with multiple back-end services via a gateway application. For illustrative purposes, the method 1000 is described with reference to the system implementations depicted in FIG. 1 and the flow of communication depicted in FIGS. 2-6. Other implementations, however, are possible.

The method 1000 involves receiving a command 402 via a graphical interface, 202 that is configured for communicating with a first service 128a operating on a first architecture and a second service 128b operating on a second architecture, as shown in block 1010. For example, the processor 110 of the server system 102 can execute the gateway application 118 to receive a command 402 from a client application 130, as described above with respect to FIGS. 1-5.

The method 1000 further involves identifying at least one of the first service 128a and the second service 128b for responding to the command 402 based on parameters extracted from the command 402, as shown in block 1020. The parameters identify at least one function provided by the at least one of the first service and the second service. For example, the processor 110 of the server system 102 can execute the gateway application 118 to identify which of the service 128a, 128b provide a function included in a command 402, as described above with respect to FIGS. 1-5.

The method 1000 further involves transforming the command 402 into a service request 404 for communication with the identified service, as shown in block 1030. For example, the processor 110 of the server system 102 can execute the gateway application 118 to transform the command 402 into a service request 404, as described above with respect to FIGS. 1-5.

The method 1000 further involves providing output to the graphical interface 202 based on a response 502 from the identified service, as shown in block 1040. For example, the processor 110 of the server system 102 can execute the gateway application 118 to provide output to the graphical interface 202. The output provided to the graphical interface 202 can include data provided by one of the services 128a, 128b via a response 502 in response to the service request 404. The output provided to the graphical interface 202 can also include presentation messages received by the gateway application 118 from one of the services 128a, 128b in response to the service request 404, as described above with respect to FIGS. 1-5.

In some embodiments, the gateway application 118 can allow one backend service 128a to communicate with another backend service 128b in a manner that shares state and authentication information without having to re-implement the routing and authentication information within the back-end services 128a, 128b. A "gateway token" can be extracted from a request to one of the back-end services 128a, 128b. The gateway token can be used to make a call to a second one of the back-end services 128a, 128b service via the gateway application 118. The gateway token can be provided to the gateway application 118 via an "Authorization" header. The first back-end service 128a provides a URL of the format "/service/request" for the second back-end service 128b. Common state information is also available to the back-end service receiving the request. For example, a report generation service can aggregate statistics from different social media services and generate a single report output by having the report generation service call the social network services via the gateway application 118. Routing, authentication, and state management can be handled automatically via the gateway application 118.

Figure 11:
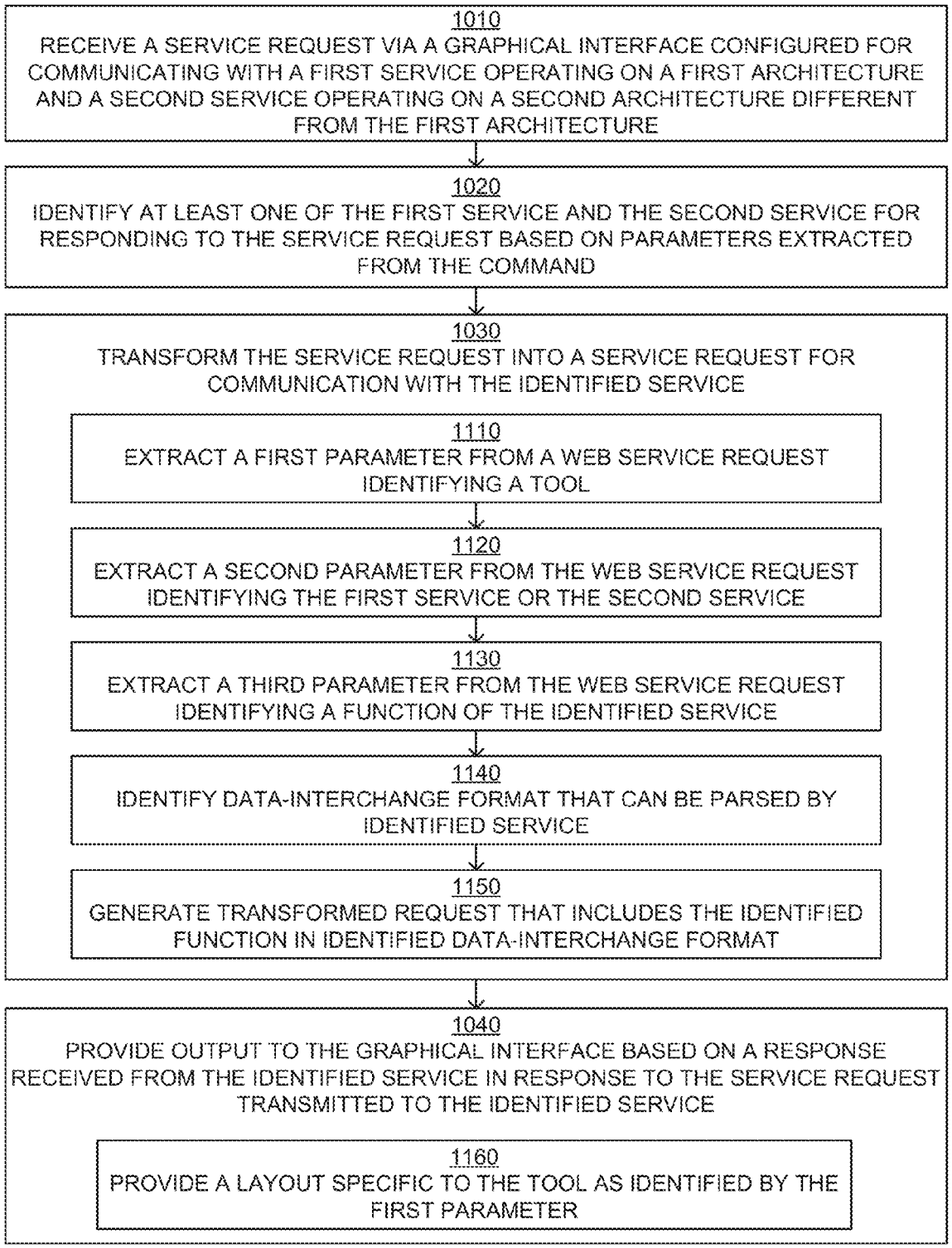
FIG. 11 is a flow chart illustrating an example method for performing a transformation feature of the example method for providing the common interface for communicating with multiple back-end services via the gateway application.

FIG. 11 is a flow chart illustrating an example method for performing the transformation feature depicted in block 1030 of the example method 1000.

Block 1030 can involve extracting a first parameter from the command 402 that identifies one of the tools 703a-c, as shown in block 1110. For example, as described above, the request 404 can include a URL such as "/SocialMarketingApplication/Service1/overview". The gateway application 118 can extract a first parameter in the URL that identifies one of the tools 703a-c (e.g., "/SocialMarketingApplication").

Block 1030 can also involve extracting a second parameter from the command 402 that identifies one of the back-end services 128a, 128b, as shown in block 1120. For example, the gateway application may extract a second parameter such as "/Service1" that identifies one of the back-end services 128a, 128b are to be accessed via the gateway application 118 (e.g., a dashboard back-end service; a publishing service configured for publishing electronic content to a social media service, an analytics service configured for analyzing interactions with the electronic published to the social media service, and a moderation service configured for moderating responsive electronic content submitted via interactions with the social media service).

Block 1030 can also involve extracting a third parameter from the command 402 that identifies a function provided by one of the back-end services 128a, 128b, as shown in block 1130. For example, the gateway application 118 can extract a third parameter such as "/overview" from the URL that identifies an "Overview" function provided by a dashboard back-end service.

Block 1030 can also involve identifying a language-independent data-interchange format that can be parsed by the identified service of the back-end services 128a, 128b, as shown in block 1140. For example, the gateway application 118 can identify JSON or another suitable data-interchange format for which the architecture of the identified back-end service has a suitable parsing component.

Block 1030 can also involve generating the service request 404 that includes the third parameter in the language-independent data-interchange format, as shown in block 1150. For example, the gateway application 118 can transmit a JSON formatted message that includes the request "overview" to a back-end service "Service1".

In some embodiments, the response 602 can include a layout specific to the one of the tools 703a-c as identified by the first parameter, as shown in block 1160. For example, for the graphical interface 202 depicted in FIG. 3, the gateway application 118 can select the service interface 304 used to render data received from an "Overview" service in a "Social Marketing Application" tool based on the first parameter having the value "/SocialMarketingApplication." The gateway application 118 can provide the service interface 304 and/or an instruction to render the service interface 304 with the response 602 provided to the client application 130. In a non-limiting example, providing a layout specific to one of the tools 703a-c can include executing one or more Javascript functions or functions from one or more other suitable graphical interface libraries to lay out data provided by an identified service in a graphical interface 202 provided by the gateway application 118.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
providing, from a gateway application to a client, a graphical interface that provides access to functions of a first service and a second service, the first service requiring a first authentication protocol for communication and the second service requiring a second authentication protocol for communication that is different from the first authentication protocol;
managing, by the gateway application, communications with the first service and the second service on behalf of the client, wherein the gateway application manages the communications on behalf of the client by performing operations comprising:
receiving a first command and a second command via a data network, wherein the first command and the second command are generated from interactions by the client with the graphical interface,
responsive to the first command, executing a first function provided by the first service by signing a first service request according to the first authentication protocol required for communicating with the first service and transmitting the signed service request to the first service,
responsive to the second command, executing a second function provided by the second service by signing a second service request according to the second authentication protocol required for communicating with the second service and transmitting the signed service request to the second service; and
providing an updated graphical interface to the client, wherein the gateway application generates the updated graphical interface based on responses to the first and second service requests received by the gateway application.

2. The method of claim 1, further comprising, in response to receiving each of the first command and the second command:
identifying a respective service of the first service and the second service for responding to a respective command based on parameters extracted from the respective command, wherein the parameters identify at least one function provided by the identified service;
transforming the respective command into a respective service request for communication with the identified service, wherein the respective service request comprises at least one of the parameters.

3. The method of claim 2,
wherein transforming the respective command into the respective service request for communication with the identified service comprises:
extracting a first parameter from the respective command identifying a social marketing application configured to receive an input generating the respective service request;
extracting a second parameter from the respective command identifying the identified service, wherein each of the first service and the second service comprises at least one of a publishing service configured for publishing electronic content to a social media service, an analytics service configured for analyzing interactions with the electronic content published to the social media service, and a moderation service configured for moderating responsive electronic content submitted via interactions with the social media service;

extracting a third parameter from the respective command identifying the at least one function;

identifying a language-independent data-interchange format that can be parsed by the identified service as identified by the second parameter, and generating the respective service request, wherein the respective service request includes the third parameter in the language-independent data-interchange format;

wherein providing the graphical interface comprises providing a layout specific to the social marketing application as identified by the first parameter for rendering data received from the identified service.

4. The method of claim 2, wherein transforming the respective command into the respective service request for communication with the identified service comprises:

generating authentication information for the identified service based on the parameters extracted from the respective service request; and generating at least one call for an application programming interface for the identified service based on the parameters extracted from the respective service request.

5. The method of claim 1, wherein the first service is accessible via a first endpoint for a first communication channel different from a second endpoint for a second communication channel via which the second service is accessible.

6. The method of claim 5, wherein each of the first communication channel and the second communication channel comprises a different respective network domain.

7. The method of claim 5, wherein each of the first communication channel and the second communication channel comprises a different respective computing system hosting a respective service.

8. The method of claim 1, wherein the gateway application generates each of the first and second service requests for each of the first and second services from each of the first and second commands by performing operations comprising:

using parameters extracted from the command to identify the service and generate authentication information for the identified service; and generating the service request that includes the authentication information and that is formatted in a language-independent format.

9. The method of claim 8, wherein the method further comprises generating, by the gateway application, the graphical interface by performing operations comprising:

determining that the first function is included in a set of functions provided by the first service and authorized for use by the client, wherein an application program interface of the second service lacks a function call for the first function;

determining that the second function is included in a set of functions provided by the second service and authorized for use by the client, wherein an application program interface of the first service lacks a function call for the second function; and generating the graphical interface based on determining that the client is authorized to use the first function and the second function, wherein the graphical interface includes a first interface element for generating the first command and a second interface element for generating the second command.

10. The method of claim 9, wherein at least one service of the first service and the second service operates in a stateless manner with respect to the client, wherein the method further comprises maintaining, by the gateway application, state information about interactions with the at least one service that involve the client, wherein maintaining the state information comprises:

establishing a session between the gateway application and the client;

storing, by the gateway application, information regarding activity by the client that occurs during the session and that is associated with the at least one service; and using, by the gateway application, the stored information to respond to subsequent commands by the client during the session that involve service requests for the at least one service.

11. The method of claim 8, further comprising:

receiving an additional command from the client that is generated by an additional interaction with the graphical interface;

obtaining, by the gateway application, state information from the first service based on a parameter that is extracted from the additional command by the gateway application; and transmitting an additional service request to the second service, wherein the gateway application generates the additional service request based on the state information obtained from the first service.

12. A non-transitory computer-readable medium tangibly embodying program code executable by a processor for providing a gateway application, the program code comprising:

program code for providing, from a gateway application to a client, a graphical interface configured for providing access to functions of a first service and a second service, first service requiring a first authentication protocol for communication and the second service requiring a second authentication protocol for communication that is different from the first authentication protocol;

program code for managing, by the gateway application, communications with the first service and the second service on behalf of the client, wherein the program code for managing the communications comprises:

program code for receiving a first command and a second command via a data network, wherein the first command and the second command are generated by from interactions by the client with the graphical interface;

program code for executing, responsive to the first command, a first function provided by the first service by signing a first service request according to the first authentication protocol required for communicating with the first service and transmitting the signed service request to the first service; and program code for executing, responsive to the second command, a second function provided by the second service by signing a second service request according to the second authentication protocol required for communicating with the second service and transmitting the signed service request to the second service;

program code for generating, by the gateway application, an updated graphical interface based on responses to the first and second service requests received by the gateway application; and program code for providing the updated graphical interface to the client.

13. The non-transitory computer-readable medium of claim 12, further comprising program code for performing operations in response to receiving each of the first command and the second command, the operations comprising:

identifying at least one of the first service and the second service for responding to the respective command based on parameters extracted from the respective service request, wherein the parameters identify at least one function provided by the identified service;

transforming the respective command into the respective service request for communication with the identified service, wherein the respective service request comprises at least one of the parameters.

14. The non-transitory computer-readable medium of claim 13, wherein transforming the respective command into the respective service request for communication with the identified service comprises:

extracting a first parameter from the respective command identifying a social marketing application configured to receive an input generating the respective service request;

extracting a second parameter from the respective command identifying the identified service, wherein each of the first service and the second service comprises at least one of a publishing service configured for publishing electronic content to a social media service, an analytics service configured for analyzing interactions with the electronic content published to the social media service, and a moderation service configured for moderating responsive electronic content submitted via interactions with the social media service;

extracting a third parameter from the respective command identifying the at least one function;

identifying a language-independent data-interchange format that can be parsed by the identified service as identified by the second parameter, and generating the respective service request, wherein the respective service request includes the third parameter in the language-independent data-interchange format;

wherein providing the graphical interface comprises providing a layout specific to the social marketing application as identified by the first parameter for rendering data received from the identified service.

15. The non-transitory computer-readable medium of claim 14, wherein transforming the respective command into the respective service request for communication with the identified service comprises:

generating authentication information for the identified service based on the parameters extracted from the respective service request; and generating at least one call for an application programming interface for the identified service based on the parameters extracted from the respective service request.

16. The non-transitory computer-readable medium of claim 12, wherein the first service is accessible via a first endpoint for a first communication channel different from a second endpoint for a second communication channel via which the second service is accessible.

17. The non-transitory computer-readable medium of claim 16, wherein each of the first endpoint and the second endpoint comprises a different respective port via which a respective service is accessible.

18. A system comprising:

a processor; and a non-transitory computer-readable medium communicatively coupled to the processor;

wherein the processor is configured to execute a gateway application embodied in the non-transitory computer-readable medium, wherein executing the gateway application configures the processor to perform operations comprising:

providing a graphical interface configured for providing access to functions of a first service and a second service, the first service requiring a first authentication protocol for communication and the second service requiring a second authentication protocol for communication that is different from the first authentication protocol, managing communications with the first service and the second service on behalf of the client, wherein managing the communications comprises:

receiving a first command and a second command via a data network, wherein the first command and the second command are generated from interactions by the client with the graphical interface, executing, responsive to the first command, a first function provided by the first service by signing a first service request according to the first authentication protocol required for communicating with the first service and transmitting the signed service request to the first service, and executing, responsive to the second command, a second function provided by the second service by signing a second service request according to the second authentication protocol required for communicating with the second service and transmitting the signed service request to the second service generating an updated graphical interface based on responses to the first and second service requests received by the gateway application, and providing the updated graphical interface to the client.

19. The system of claim 18, wherein executing the first function and the second function comprises:

generating authentication information for the first service and the second service based on parameters extracted from the first command and the second command; and generating a first function call for the first service and a second function call for the second service based on the parameters extracted from the first command and the second command.

20. The system of claim 18, wherein executing at least one of the first function and the second function comprises rendering a data request from at least one of the first service and the second service in the updated graphical interface.

* * * * *